United States Patent
Friedriech et al.

(10) Patent No.: US 12,422,066 B2
(45) Date of Patent: Sep. 23, 2025

(54) COUPLER WITH CROWN HEAD FOR COUPLING PIPES

(71) Applicants: Jacob Friedriech, Tivon (IL); Avraham Tavor, Yokneam Ilit (IL)

(72) Inventors: Jacob Friedriech, Tivon (IL); Avraham Tavor, Yokneam Ilit (IL); Evgeny Nayman, Afula (IL)

( * ) Notice: Subject to any disclaimer, the term of this patent is extended or adjusted under 35 U.S.C. 154(b) by 104 days.

(21) Appl. No.: 17/751,698

(22) Filed: May 24, 2022

(65) Prior Publication Data
US 2023/0021084 A1 Jan. 19, 2023

Related U.S. Application Data

(60) Provisional application No. 63/208,009, filed on Jun. 8, 2021.

(51) Int. Cl.
*F16L 21/06* (2006.01)
*F16L 21/00* (2006.01)
*F16L 21/02* (2006.01)

(52) U.S. Cl.
CPC ........... *F16L 21/065* (2013.01); *F16L 21/005* (2013.01); *F16L 21/02* (2013.01)

(58) Field of Classification Search
CPC . F16L 21/00; F16L 21/02; F16L 21/03; F16L 21/005; F16L 21/06; F16L 21/065; F16L 21/08; F16L 25/06; F16L 37/04; F16L 37/05; F16L 37/12; F16L 37/122; F16L 37/123; F16L 37/127; F16L 37/16
See application file for complete search history.

(56) References Cited

U.S. PATENT DOCUMENTS

| | | | | | |
|---|---|---|---|---|---|
| 4,110,144 | A | * | 8/1978 | Buehler | F16L 37/02 156/173 |
| 4,666,192 | A | * | 5/1987 | Zamora | F16L 33/221 285/918 |
| 5,722,702 | A | * | 3/1998 | Washburn | F16L 37/091 285/369 |
| 2004/0007875 | A1 | * | 1/2004 | Bishop | F16L 21/06 285/369 |

(Continued)

*Primary Examiner* — Aaron M Dunwoody
(74) *Attorney, Agent, or Firm* — Jose Cherson Weissbrot

(57) ABSTRACT

A pipe coupler for coupling pipes of different kinds with a one or more crown partially flexible heads, integrated into the ends of the pipe coupler for accommodating grip rings and seals for coupling pipes of different kinds. The crown heads have planes at different levels that form grooves for accommodating the seals, and a backward trimmed cone-shape inner surface plane and flat plane for locking the grip rings inside corresponding recesses in the crown head. The external surface of the grip rings is also cone-shaped that corresponds the shape of the inner surface of the crown head and in friction contact with this inner surface. The grip ring blocks the seal from slipping out, and has sets of teeth for engaging with and locking to a pipe inside the coupler. Clamp bands wrap around the external surface of the crown heads that yield against it, thereby tightening the grip of the teeth in the pipe as internal pressure increases inside the pipe and causes the grip ring to axially travel towards the proximal end of the crown head. All parts of the coupler are made of synthetic materials and thereby avoid corrosive processes.

11 Claims, 7 Drawing Sheets

(56) References Cited

U.S. PATENT DOCUMENTS

2009/0160183 A1\* 6/2009 Felber ................ F16L 25/0072
 285/148.26
2018/0216760 A1\* 8/2018 Beatson ................ F16L 25/14
2021/0285579 A1\* 9/2021 French .................... F16L 47/12
2023/0021084 A1\* 1/2023 Friedriech ............. F16L 21/005

\* cited by examiner

COUPLER WITH CROWN HEAD FOR COUPLING PIPES

TECHNICAL FIELD

The present invention pertains to a pipe coupler for coupling pipes of different kinds. More particularly, the present invention pertains to a pipe coupler with one or more crown partially flexible heads, which are integrated into the ends of the pipe coupler for accommodating a grip ring and an seal for coupling pipes of different kinds.

BACKGROUND

A grip ring is essentially a ring with sharp teeth that extend longitudinally in inclined inward position relative to the ring. A pipe that passes through the grip ring is stopped by the grip ring teeth that hold to it without letting it retract or move from its place. The contact of the grip ring with the pipe is based on a relatively strong friction force in the longitudinal direction of the pipe. Therefore, the stronger the force that is applied on the coupler/fitting, the stronger the teeth of the grip ring penetrate into the surface of the pipe, and the stronger the pipe is held inside the coupler or fitting during application of inner pressure in the pipe. To obtain this, application of an external force may benefit in pressing the grip ring teeth onto the pipe wall. A current solution is provided in the art and illustrated in FIG. 1, showing a double crown head coupler 200 for coupling pipes of different types. This coupler 200 has a grip ring 215 and a seal 220, which are placed inside the two ends of its crown heads 227. Usually, seals are located inside a cavity in a fitting body or coupler and are intended to seal the gap between the pipe and the body to prevent water or air leakage from inside the pipe. To fix the grip ring and seal in place inside the crown heads, dedicated grooves 215a and 220a are carved within the crown heads. A pipe inserted into the coupler body 226 passes through the grip ring, then the seal until blocked by internal stopper 230. After introducing the pipe into the coupler, band clamps 210 are manually fastened to the coupler heads, thereby pressing the grip rings onto the pipe and tightening their hold of the pipe surface. This configuration is advantageous, because it increases the hold of the grip rings to the pipes and holds them more strongly in place. It is also advantageous for enabling the use of metal grip rings that do not break under pressure. However, its disadvantage is its structural complexity that requires dedicated grooves for the grip ring and seal, which are cut in an expensive and complicated machining process or a complex injection-molding process. Such structure also limits the pressure that the band clamps can apply on the grip rings, which are partly protected from such pressure in their grooves. This is because such pressure spreads over the entire thickness of the crown heads and is only partially transferred to the grip rings. As a result, fixing the grip rings to a pipe in the coupler needs greater pressure by more strongly fastening the clamp bands on the coupler crown heads.

It is an additional disadvantage of this configuration that as a pressure develops inside the pipe, the grip-ring remains in place, and the entire resistance to the internal pressure is based on the initial tightening force applied by the external metal ring, the mechanical stability of the metal grip ring teeth and the initial tightening force of the external metal ring.

It is, therefore, an object of the present invention to provide a coupler that overcomes the disadvantages of the prior art.

It is, therefore, another object of the present invention to provide a mechanism that improves the grip of the pipe as the pressure increases.

It is yet another object of the present invention to provide a coupler that does not have a complicated structure, which is also inexpensive, to accommodate grip rings and seals for holding pipes.

It is yet another object of the present invention to provide a coupler with stronger hold of the grip rings to pipes, which are introduced into it.

It is yet another object of the present invention to provide a coupler with clamp bands, which are made of synthetic materials.

These and other objects will become apparent as the description proceeds.

SUMMARY

In one aspect, the present invention provides a pipe coupler with one or more crown head ends that are integrated into the coupler body for accommodating grip rings and seals. The crown head of the coupler body also has a sloped structure in the internal surface to accommodate the grip ring. The grip ring has a trimmed cone plane and a flat plane that form a ridge between them. The grip rings are also crown-shaped and correspond to the crown shape of the coupler ends. The grip ring also has a sloped shape on its external surface that corresponds to the sloped shape of the inner slope of the crown head, thus causing the grip ring to tighten on a pipe upon application of internal pressure in the pipe. The distal part of the coupler end has planes at different levels that form a groove for accommodating the seals. This design locks the grip rings in place when introduced into the crown head. The grip ring also presses the seal into its groove and prevents it from slipping out. Band clamp, i.e. metal ring, wraps around the external surface of the crown head that is partially flexible and yields to the pressure that the clamp applies on it. In turn the grip ring presses onto the pipe and increases the hold of its teeth on the outer surface of the pipe.

The configuration of the present invention provides a cost-effective solution for a pipe coupler without a complicated structure and expensive metalworking. In addition, this configuration enables to use synthetic materials in all parts of the coupler, including the clamp band. This is because the clamp band can apply direct, greater pressure on the crown head and grip ring. A further advantage is that a coupler, which is made of completely synthetic materials, is corrosion-free.

Therefore, the present invention provides a pipe coupler for coupling pipes of different kinds, where the coupler comprises:
  a main body;
  a crown head at one or more ends of the main body;
  an seal inside each of the crown head(s);
  a grip ring inside each of the crown head(s); and
  a clamp band that wraps around external surface of each one of the crown head(s),
  where the seal is accommodated inside a groove that is formed between planes at distal end of the crown head(s), where these planes are at different levels one relative to the other,
  where the grip ring comprises planes at different levels one relative to the other, and these planes block the seal from slipping out of the coupler and the grip ring from slipping out of the crown head. These planes are in frictional contact with corresponding recesses in the crown head, where the crown head is sufficiently flexible to yield against external pressure that the clamp band applies on its external surface.

In another embodiment, the pipe coupler's configuration improves hold of the grip ring to a pipe inserted into the coupler by generating a combination of forces on the ring in different directions.

Specifically, the internal surface of the crown head has a reverse slope configuration that matches a reverse slope of the external surface of the grip ring. At the proximal end of the crown head, the band clamp fastens the crown head onto the grip ring. In this configuration, a pressure developing inside the pipe presses the pipe walls on the grip ring against the internal surface of the crown head. The reverse slopes of the ring external surface and crown head internal surface cause the pressed ring to travel out towards the proximal end of the crown head. At the proximal end, the clamp band blocks the ring from travelling further outside. This results in three force vectors that operate on the grip ring at the same time: an internal radial force inside the pipe, an opposite counter force of the crown head and an axial force of the clamp band. This in turn generates opposing forces on the ring and its teeth, because as the ring travels away from the pipe, its teeth, which already hold on to the pipe surface, pull against its travelling in the axial direction. This causes the teeth to penetrate deeper into the pipe wall and strengthen the hold of the grip ring to the pipe, and eventually the pipe is better fixed in place inside the coupler.

In view of the above, in another embodiment, the present invention provides a pipe coupler for coupling pipes of different kinds, where the coupler comprises:

a main body with a sloped internal surface;
a crown head at one or more ends of the main body;
an seal inside each of the crown head(s);
a grip ring inside each of the crown head(s); and
a clamp band that wraps around external surface of each one of the crown head(s),
where the grip ring comprises a set of sharp teeth in its internal surface and a reverse slope shape in its external surface, where the slope shape of the external surface of the grip ring corresponds to a slope shape of the internal surface of the crown head(s),
where the grip ring is positioned inside the sloped cavity of the crown head, and being tightened to the pipe from outside by the clamp band. The grip ring travels axially along the sloped surface once pressure is applied inside the pipe and by that increases the grip of the inner teeth to the pipe as the pressure increases.

DETAILED DESCRIPTION OF THE DRAWINGS

Figure 2:
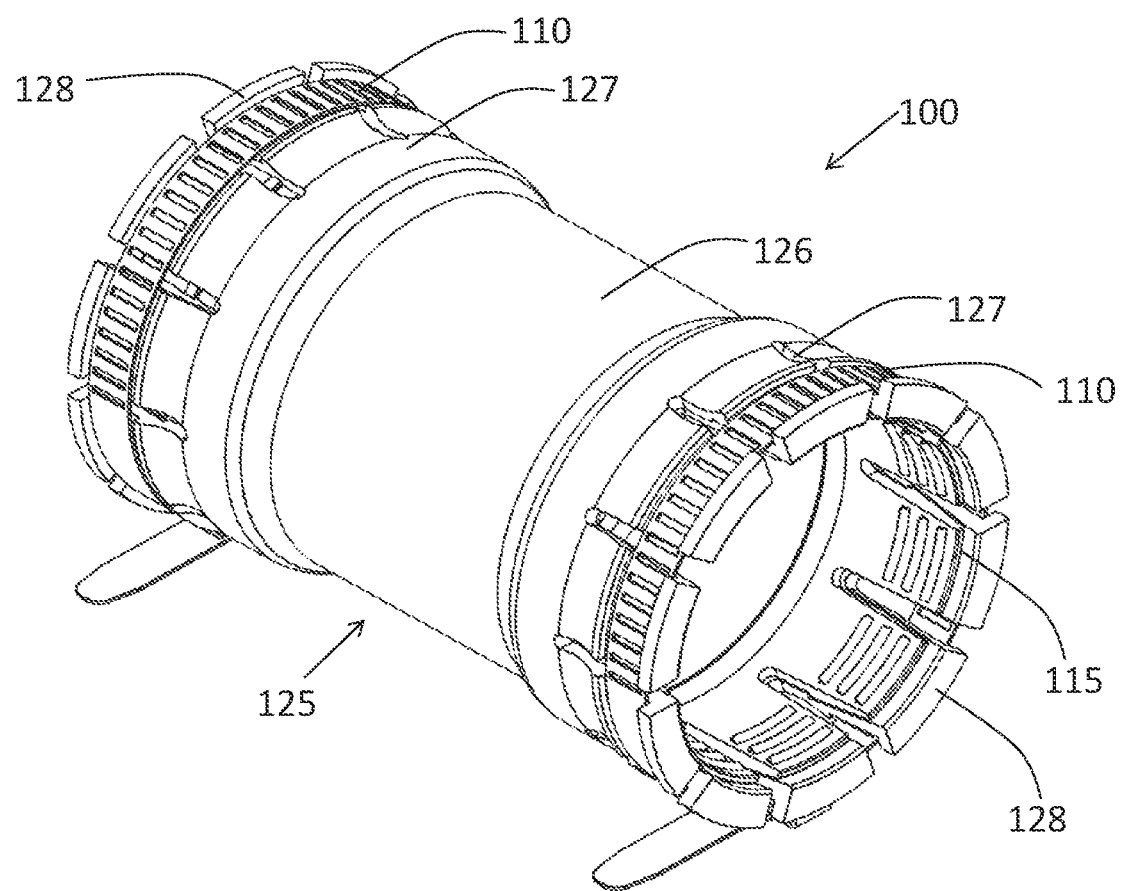
FIG. 2 illustrates a pipe coupler of the present invention.

FIG. 2 illustrates the pipe coupler 100 of the present invention with two crown-shape heads 127 of the present invention. It should be noted that this design of a pipe coupler is only exemplary of the pipe coupler of the present invention, and other designs with a different number of crown-shape heads are contemplated within the scope of the invention. The body 125 of this coupler comprises a main body 126 ending in two crown-shape heads 127 with a plurality of parts 128 that extend outwards and are distanced from each other with defined grooves between neighbour parts. Such crown shape, together with a partially elastic material from which the coupler 100 is made, enable pressing the crown parts towards the coupler inner volume. This in turn presses a grip ring against a pipe inserted through as is explained below. A grip ring 115 (see also FIG. 3) is installed inside the crown head 127 of the coupler.

Grip ring 115 overlaps the crown head inner surface, and is in friction contact with this inner surface, more specifically its parts. As a result, applying pressure on the crown head will also press the grip ring onto the outer surface of a pipe introduced into the coupler and fix the pipe in place. When two pipes slide inside the coupler through the coupler ends, they are blocked from sliding through to the opposite end by an inner ring stopper 130, which is located in the middle 126 of the pipe body.

Figure 1:
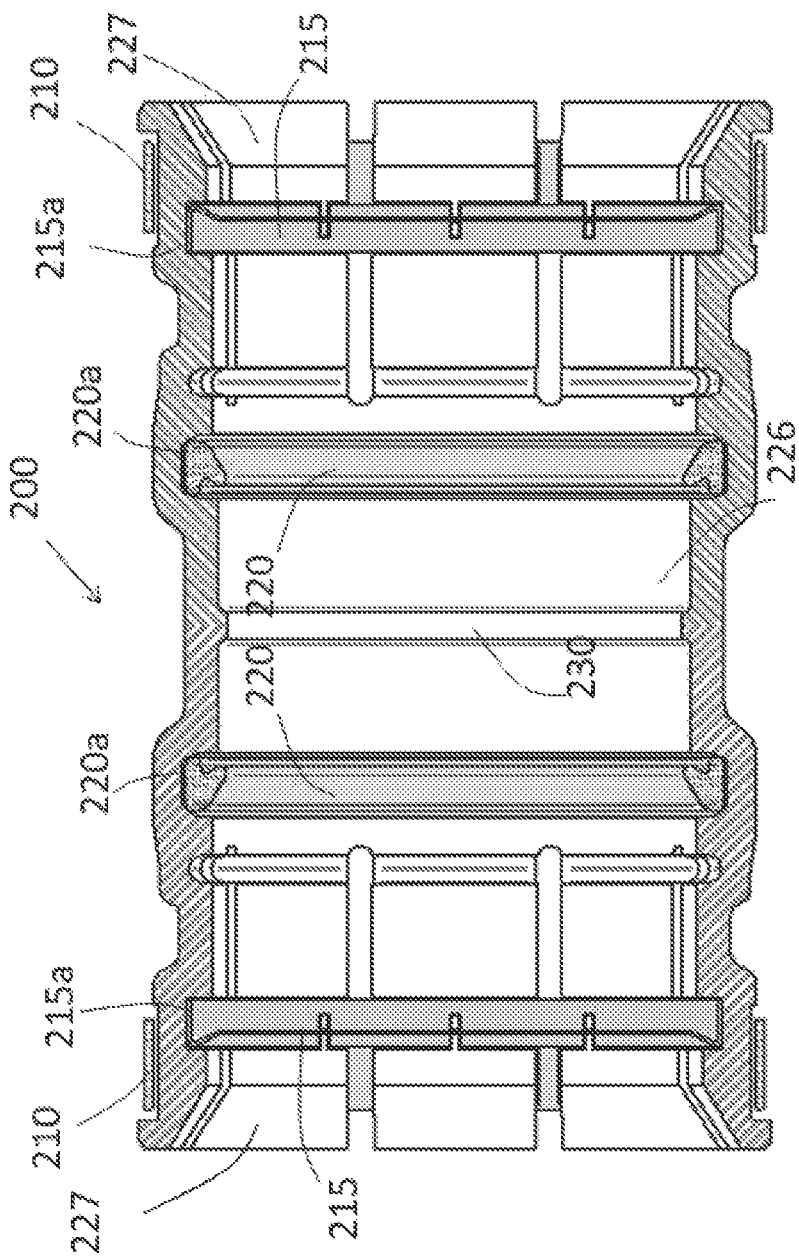
FIG. 1 illustrates a cross section of a pipe coupler of the prior art.

To improve hold of the grip ring 115 to the pipe surface, the grip ring comprises three sets of parallel teeth 119 that simultaneously engage with the pipe outer surface, as the crown head and grip ring are pressed against the pipe. The crown heads of the coupler are so designed that their inner and outer diameters are larger than the diameter of the coupler body 126. This difference in diameters naturally forms a shoulder that serves as a groove 120a. This groove is suitable for accommodating an seal 120. The seal is inserted into the crown head until blocked by this shoulder on one side and rests on it. To fix it firmly in place, the seal is blocked from slipping out by the grip ring 115 distal end 117 that interfaces its opposite side. The grip ring 115 is locked inside the crown head with a design of the inner surface of the crown head that locks it in place as is explained below. This design of the interior surface of the crown head 127 provides an improved non-expensive and less complicated configuration for locking the grip ring and seal in this coupler 100 than the configuration in the prior art as shown in FIG. 1. It actually uses the friction contact between the grip ring and seal, the grip ring and crown head and the crown head and clamp band to fix the rings together and strongly hold the pipes in place. The design of the coupler of the present invention is also cost effective relative to the prior art, because it does not require expensive design and cutting of dedicated grooves for the grip ring and seal. It also benefits in two mechanical advantages. First, it enables to apply greater external pressure on the grip ring to more strongly engage with the outer surface of pipes which are introduced into the coupler. This is because the grip ring has a direct mechanical friction interface with the flexible parts of the crown head. The second advantage is the possibility of using a grip ring, which is made from a synthetic material instead of a metallic material. This results from the first advantage, because such synthetic grip ring yields better under externally applied pressure and does not develop corrosion as does a metallic grip ring.

Figure 4:
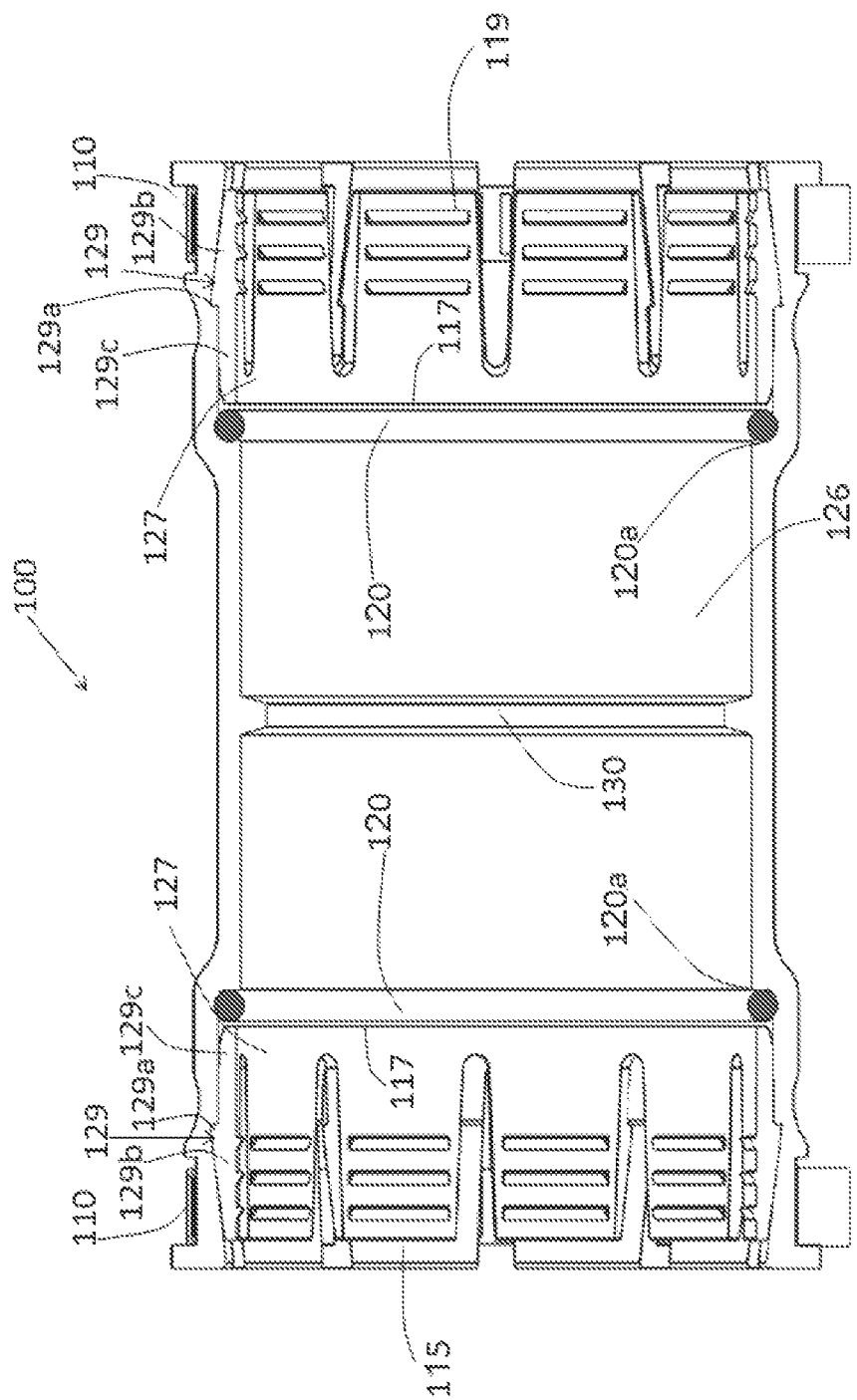
FIG. 4 illustrates a cross-section of the pipe coupler of the present invention.

FIG. 4 illustrates a cross section of the coupler 100 of the present invention. Particularly, the cross section shows the design of the outer surface 129 of the grip ring that interfaces the corresponding inner surface of the crown head of the coupler. As shown, outer surface 129 comprises two planes 129b and 129c at different levels one relative to the other. Plane 129b has a backward slope with a shape of a trimmed cone, and a plane 129c that is flat with a height that is lower than or at most of the same or close to the height of the lowest end of the trimmed cone of plane 129b. The interface between the two planes forms a ridge 129a. These two planes of the grip ring match respective recesses at the inner surface of the crown head, so that the flat plane 129c is the first to slide into the space of the crown head. Plane 129c of the grip ring slides easily into the inner volume of the crown head until it meets the ridge 129a, because it is located further within the volume of the crown head relative to the trimmed cone 129b. After flat plane 129c locates in its corresponding recess in the crown head, ridge 129a follows, slides and sits on the corresponding recess in the crown head at the proximal end of plane 129c. Then trimmed cone-shape plane 129b with the reverse slope follows and gets blocked by the corresponding recess of ridge 129a in the crown head. This prevents the grip ring from sliding through further into the coupler and keeps it pushing against the seal 120. Clamp band 110 applies external pressure on the crown head at its proximal end and as a result on the proximal end grip ring, and keeps the ring from slipping out of the crown head. Grip ring 115 then blocks seal 120 from slipping out. This fixes the seal in place with the shoulder of the crown head on one side and the grip ring on the opposite side.

The friction of the two planes 129b and 129c with their respective recesses in the crown head holds the grip ring in place. Then, when band clamp 110 tightens over the crown head, crown parts 128 yield and press against corresponding parts 118 of the grip ring 115 and tighten their hold of the grip ring on a pipe that is inserted into the coupler. Then grip ring teeth 119 fix deeper into the outer surface of the pipe and more strongly hold it in place. This completes the configuration of the coupler 100 that uses level differences in planes and frictional contact between planes to mutually hold all its parts together.

Figure 6A:
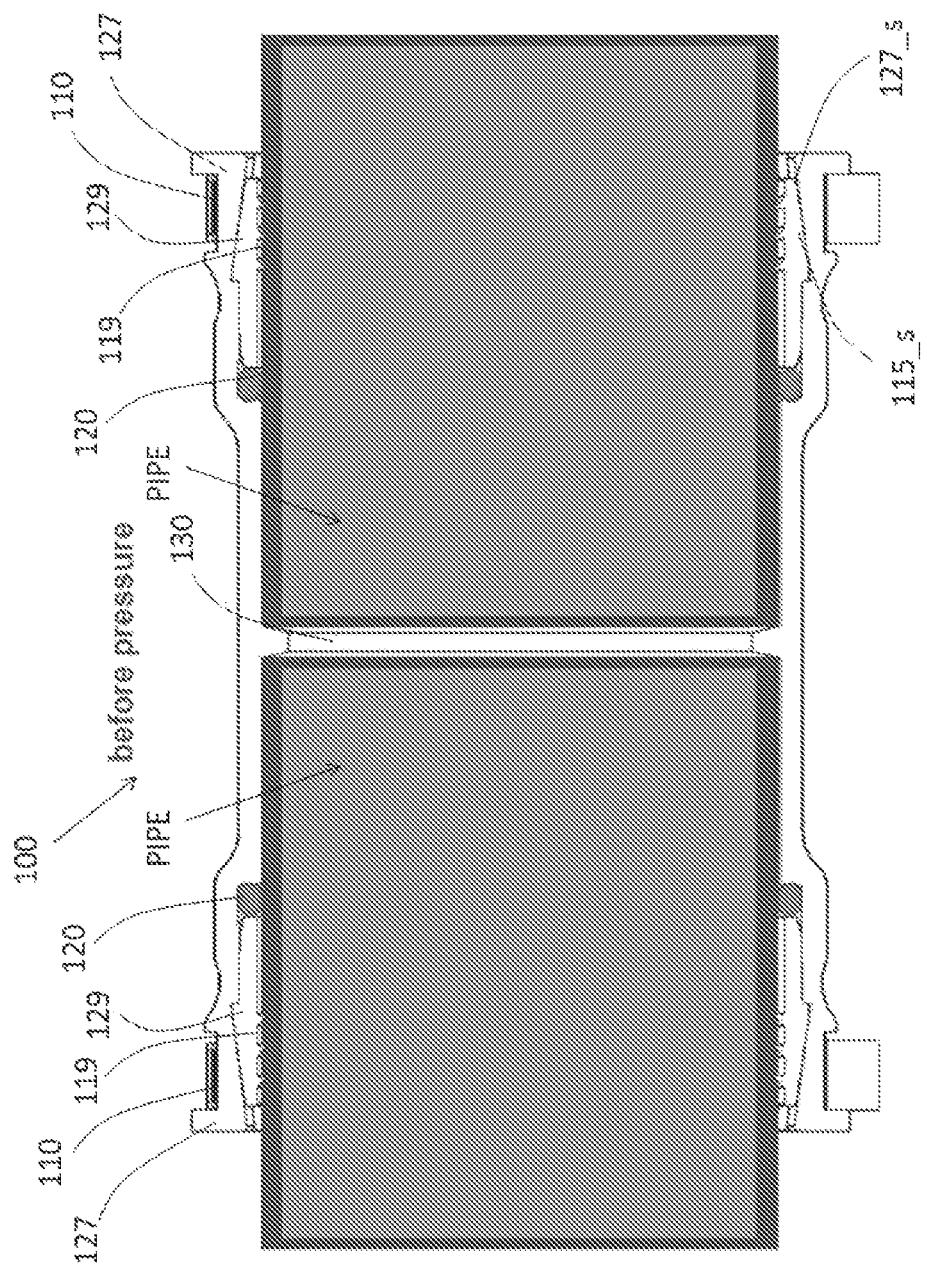
FIGS. 6A-6B schematically illustrate the states of the grip ring without and with internal pressure inside a pipe inserted into the pipe coupler of the present invention.
Figure 6B:
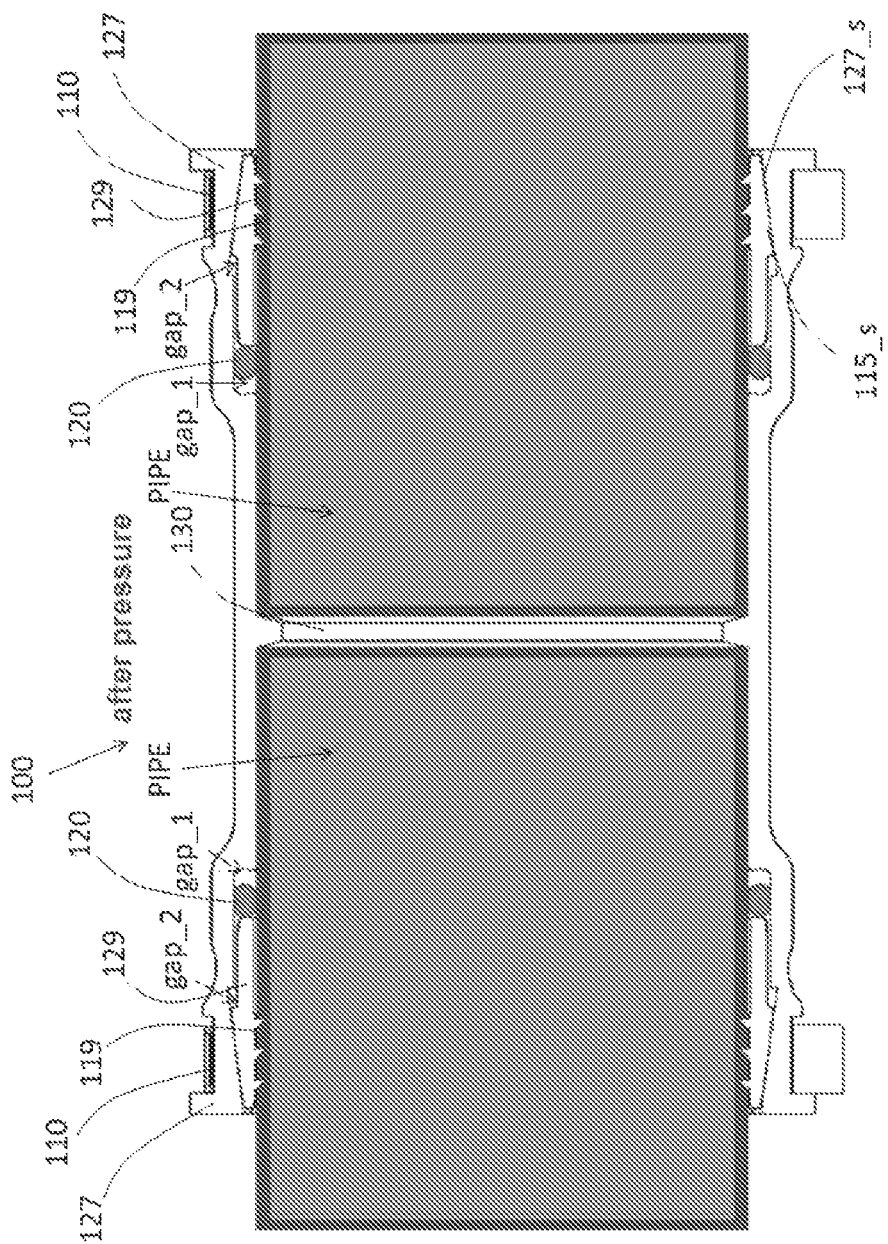

Furthermore, FIGS. 6A and 6B show that the crown head 127 has an internal reverse slope surface 127_s, inclined in a specific angle that may range between 8 and 12 deg. The grip ring 115 has an external reverse sloped surface 115_s, inclined in a same or similar slope as the sloped surface 127_s of the crown head inner surface. Both these slopes surfaces are in friction contact with each other. When installing, the band clamp 110 tightens over the crown head, crown parts 128 yield and press against corresponding parts 118 of the grip ring 115. Then the grip ring teeth 119 penetrate into the outer surface of the pipe. Once an internal pressure develops inside the pipe, the pipe tends to expand towards the grip ring and extract out of the coupling body by the pull forces that the internal pressure inside it creates. Once the pipe expands against the coupler body, a minor volume tolerance of the crown head 127 enables the grip ring teeth 119 to translate the radial pressure in the pipe to axial traveling outwards of the crown head 127. Since the sloped surface 127_s inclines towards the external perimeter of the crown head of the coupler body, the grip ring teeth respond in a counter force to the force that the axial movement of the grip ring 115 creates as it travels away towards the proximal end of the crown head. This counter force creates a tighter grip of the grip ring teeth to the pipe, forcing the grip ring to resist the developing internal pressure inside the pipe. As the pressure increases, the axial movement of the grip ring increases, thus increasing its grip even more. This is shown in the change of angle of the teeth 119 of the grip ring 115 relative to the pipe. In FIG. 6A the teeth 119 are vertically oriented relative to the pipe. A growing radial pressure in the pipe presses the grip ring 115 against the crown head 127 and causes it to relieve the pressure with outwards axial travelling. As a result, the teeth 119, which are oriented vertically relative to the pipe, are dragged together with the axial travelling of the grip ring 115. However, since they are fixed to the pipe, they incline towards the direction of travelling as shown in FIG. 6B, which further makes them penetrate deeper into the pipe and fixes their hold of it. The volume tolerance of the crown head 127 enables this axial traveling of the grip ring 115, which creates two gaps. Because the clamp band limits the distance of traveling of the grip ring, the traveling out of the grip ring relative to the crown head that remains in place results in gap_1 between the seal and the proximal end of the crown head, and gap_2 between the grip ring and inner sloped surface of the crown head. This volume tolerance of the crown head actually generates the chain of actions of axial traveling of the grip ring, causing its teeth to incline and counter act by penetrating deeper into the pipe. This eventually better fixes the pipe in the coupler body.

Figure 3:
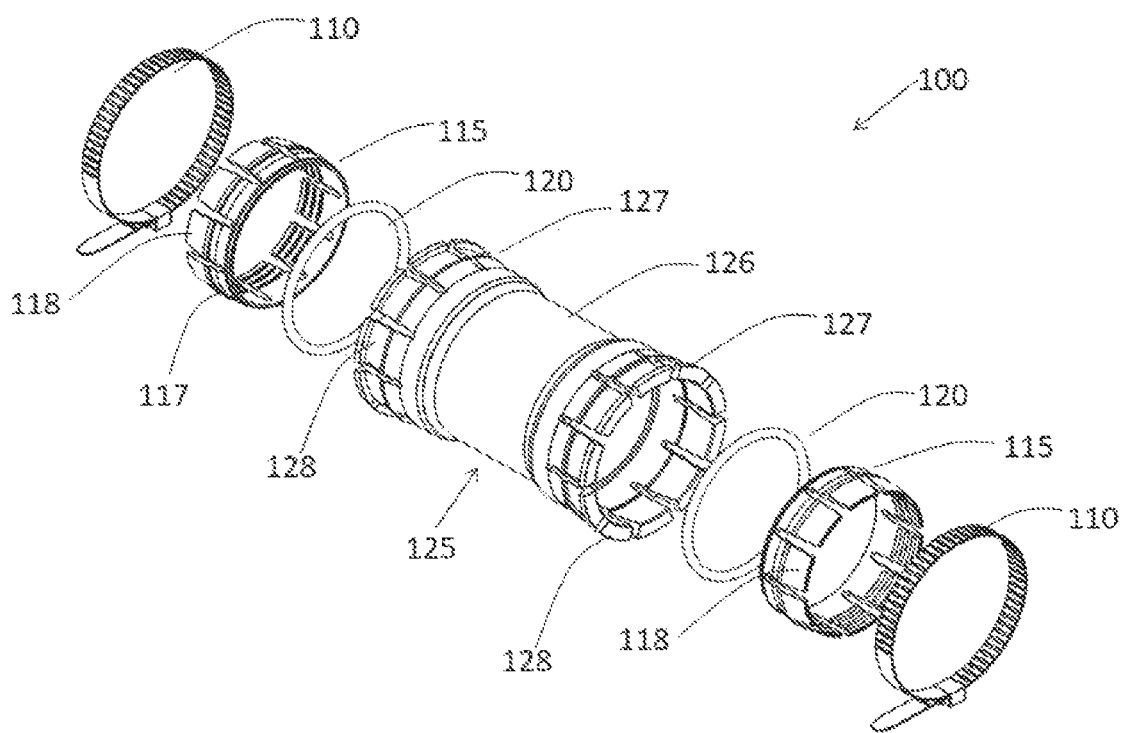
FIG. 3 illustrates an exploded view of the pipe coupler of the present invention.

FIG. 3 illustrates an exploded view of the coupler 100, showing its different parts separate from each other. All the coupler parts, including clamp bands 110, are made of synthetic materials. This is advantageous in corrosive environments and applications, unlike current couplers that use metallic clamp bands, e.g. FIG. 1.

Figure 5:
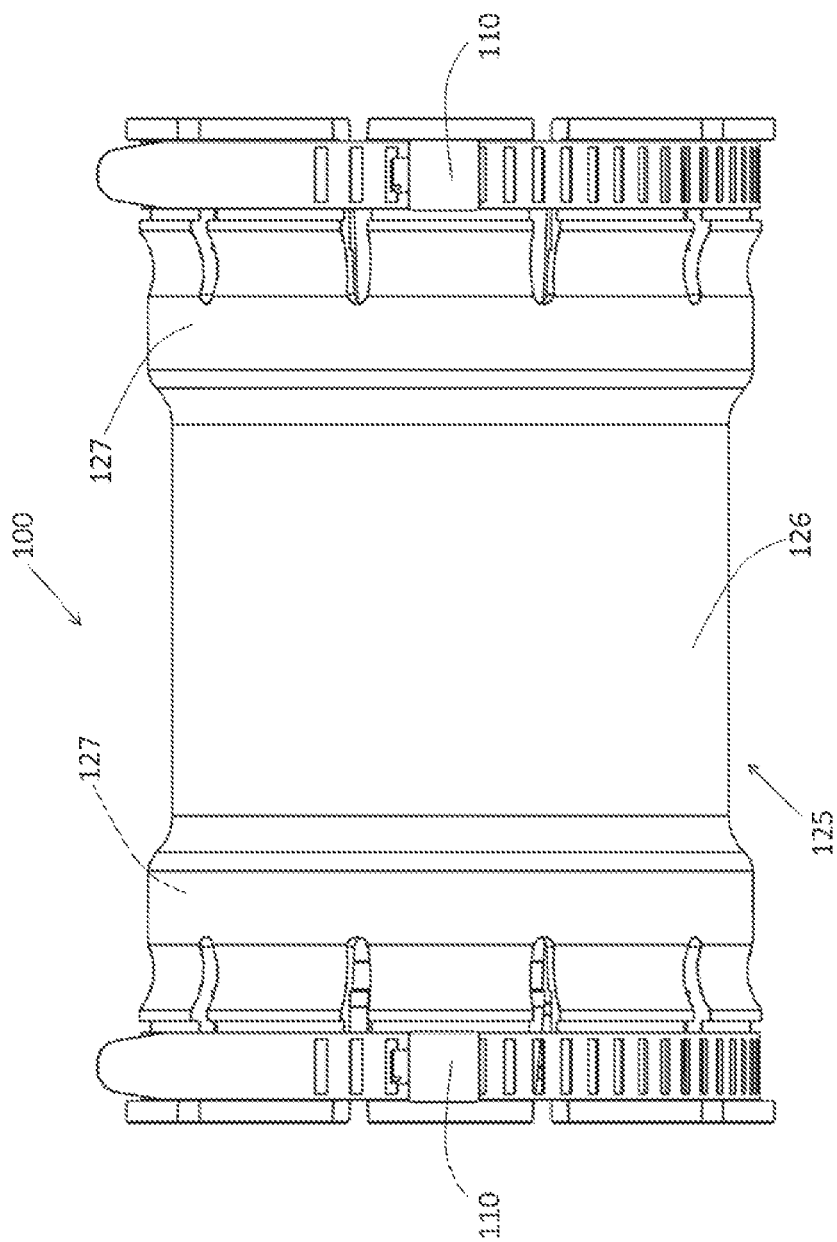
FIG. 5 illustrates a side view of the pipe coupler of the present invention.

FIG. 5 illustrates a side view of the coupler 100 with the clamp bands 110 tightened against the crown heads 127 of the coupler body 125.

The invention claimed is:

1. A pipe coupler for coupling pipes of different kinds, said pipe coupler comprising:
   a main body;
   a crown head with a reverse slope internal surface at one or more ends of said main body;
   a seal inside each of said crown head(s);
   a grip ring with a reverse slope shape in its external surface inside each one of said crown head(s); and
   a clamp band that wraps around external surface of each one of said crown head(s),
   wherein said grip ring comprises a set of sharp teeth in its internal surface,
   wherein said reverse slope shape of said external surface of said grip ring corresponds to and in friction contact with said reverse slope shape of said internal surface of said crown head(s),
   wherein said grip ring is positioned inside a sloped cavity of said crown head(s) and configured to be tightened to a pipe from outside by said clamp band,
   wherein said grip ring is configured to travel axially along said reverse slope surface of said crown head(s) upon development of radial pressure inside said pipe and increase grip of said inner teeth on outer surface of said pipe with increase of said pressure.

2. The pipe coupler according to claim 1, wherein said grip ring comprises three sets of teeth for engaging into and holding to outer surface of said pipe introduced into said coupler.

3. The pipe coupler according to claim 1, wherein said crown head(s) comprises a plurality of parts extending out and separated from each other, wherein said grip ring is in a crown shape and comprises a plurality of parts extending out and corresponding said parts of said crown head(s).

4. The pipe coupler according to claim 1, wherein said planes of said grip ring comprise a backward slope and trimmed cone shape plane and a flat plane, wherein said flat plane is at distal end of said grip ring and configured to be in contact with said seal.

5. The pipe coupler according to claim 1, further comprising an inner stopper in middle of said main body of said coupler, wherein said inner stopper blocks movement of said pipe introduced into said coupler on both sides of said coupler.

6. A pipe coupler for coupling pipes of different kinds, said coupler comprising:
   a main body;
   a crown head at every end of said main body;
   a seal inside each one of said crown heads;
   a grip ring inside each one of said crown heads; and
   a clamp band that wraps around an external surface of each one of said crown heads,
   wherein said seal is accommodated inside a groove that is formed between planes at distal ends of said crown heads, wherein said planes are at different levels one relative to the other,
   wherein said grip ring comprises planes at different levels one relative to the other, said planes blocking said seal from slipping out of said coupler and said grip ring from slipping out of said crown heads and are in frictional contact with corresponding recesses in said crown heads,
   wherein said crown heads are sufficiently flexible to yield against external pressure that said clamp band applies on external surface of said crown heads.

7. The pipe coupler according to claim 1, wherein said grip ring comprises three sets of teeth for engaging into and holding to outer surface of a pipe introduced into said coupler.

8. The pipe coupler according to claim 1, wherein said crown head(s) comprise a plurality of parts extending outwards and separated from each other, wherein said grip ring is in a crown shape and comprises a plurality of parts extending out and corresponding and overlapping said plurality of parts of said crown head(s).

9. The pipe coupler according to claim 1, wherein said planes of said grip ring comprise a backward slope and trimmed cone shape plane and a flat plane, wherein said flat plane is at distal end of said grip ring and configured to be in contact with said seal.

10. The pipe coupler according to claim 1, wherein said crown head(s) comprise a minor volume tolerance in accommodating said grip ring, wherein said minor volume tolerance enables axial travelling of said grip ring outwards relative said crown head upon radial pressure in said pipe, wherein said grip ring teeth incline outwards with said axial travelling of said grip ring, penetrate deeper into said pipe and fix their hold of it.

11. The pipe coupler according to claim 10, wherein said axial travelling of said grip ring relative said crown head creates a gap between said seal and proximal end of said crown head, and between said grip ring and inner sloped surface said the crown head.

* * * * *